United States Patent Office 3,483,094
Patented Dec. 9, 1969

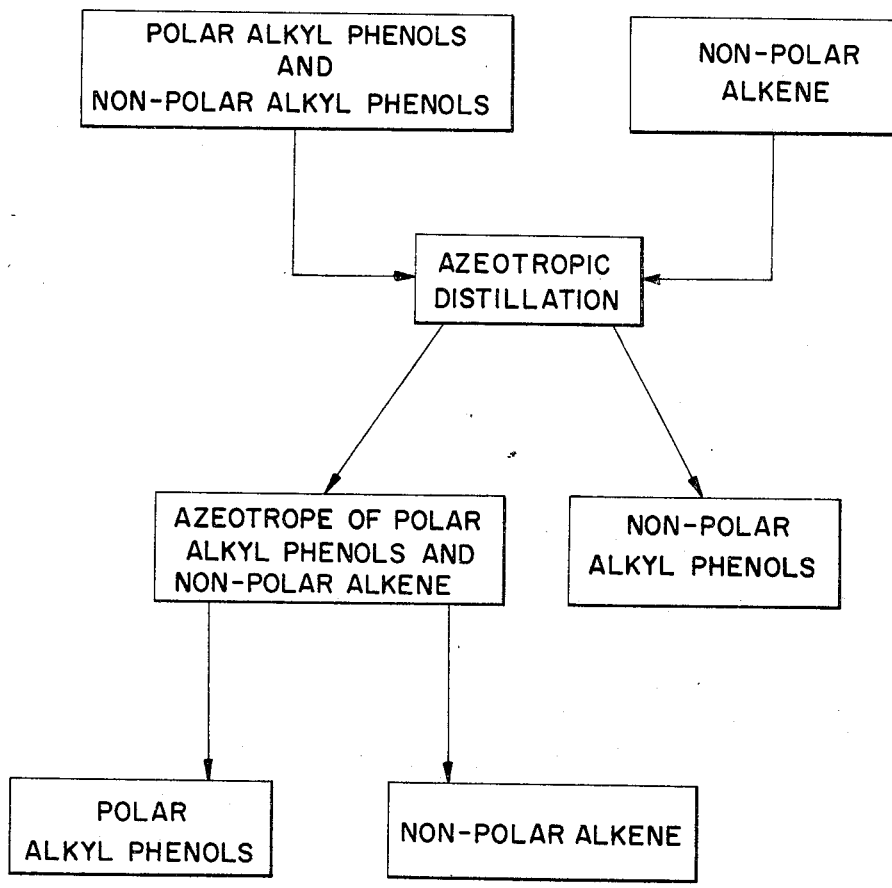

3,483,094
PROCESS FOR SEPARATION OF ALKYL PHENOLS BY AZEOTROPIC DISTILLATION WITH A 10–13 CARBON ATOM ALKENE
Louis L. Parisse, Oil City, Pa., assignor to Koppers Company, Inc., a corporation of Delaware
Continuation-in-part of application Ser. No. 600,492, Dec. 9, 1966. This application May 28, 1968, Ser. No. 732,579
The portion of the term of the patent subsequent to Aug. 13, 1985, has been disclaimed and dedicated to the Public
Int. Cl. B01d 3/36, 3/34
U.S. Cl. 203—70     9 Claims

ABSTRACT OF THE DISCLOSURE

Polar alkyl phenols preferentially azeotrope with a non-polar alkene so that the azeotroped alkyl phenol is separable by distillation from less polar alkyl phenols. The non-polar alkene should have about 12 carbon atoms and its boiling point should be within 30° C. of the alkyl phenol with which it is to azeotrope.

CROSS-REFERENCE

This application is a continuation-in-part of application Ser. No. 600,492, filed Dec. 9, 1966.

BACKGROUND OF THE INVENTION

This invention relates to a process for the separation and purification of alkyl phenols, particularly, to the separation of alkyl phenols from a mixture of alkyl phenols having close boiling points but differing degrees of polarity by adding to the mixture an azeotroping agent which preferentially azeotropes at least one of the alkyl phenols.

Mono- and polymethyl phenols are naturally occurring phenols found in coal tar distillates such as derived from bituminous coal. Dimethyl phenols, as well as trimethyl phenols, are also obtained as by-products in the alkylation of phenol to produce 2-methyl phenol (o-cresol). The dimethyl phenols exist in six isomeric forms, as do also the trimethyl phenols.

Certain of the methylphenol isomers are valuable as intermediates for the synthesis of, for example, antioxidants, while others may be used as polymerizable monomers. For example, 2,6-dimethyl phenol is a valuable isomer which is used in the preparation of aromatic polyethers such as polyphenylene oxide. It is, therefore, desirable to obtain the isomer in a highly purified form. Unfortunately, when 2,6-dimethyl phenol is produced synthetically or is produced from coal tar distillates, monomethyl phenols (cresols) are present. For example, when 2,6-dimethyl phenol is present in what is called the cresol distillate or fraction of coal tar by-product—named for the monomethyl phenols (cresols) which are in this fraction—it is almost impossible to separate the 3-methyl phenol and 4-methyl phenol from the dimethyl phenol by ordinary distillation techniques due to the close boiling points of the compounds, (201° C. for 2,6-dimethyl phenol, 208.8° C. for 3-methyl phenol, and 202.5° C. for 4-methyl phenol.)

SUMMARY OF THE INVENTION

It has now been discovered that alkyl phenol mixtures having very close boiling points may be separated by the addition of an alkene azeotroping agent to the mixture.

In accordance with the invention, alkyl phenols having close boiling points may be separated by:

(a) Adding to a mixture of alkyl phenols wherein at least one alkyl phenol is more polar than the others, a non-polar higher alkene having a boiling point within about 30° C. of the more polar alkyl phenol to form an azeotrope of the alkene and the more polar alkyl phenol.

(b) distilling the mixture to separate the azeotrope from the less polar alkyl phenol.

DETAILED DESCRIPTION

While the exact mechanism by which the alkene preferentially azeotropes with one or more of the alkyl phenols is not completely understood, it is believed that the alkene, being a non-polar molecule, is preferentially attracted to the most polar alkyl phenol or phenols, for example, to 3-methyl phenol and 4-methyl phenol rather than 2,6-dimethyl phenol due to the steric hindrance and thus low polarity of the 2,6-dimethyl phenol.

The higher alkenes useful in this invention are those having from 10–13 and preferably 12 carbon atoms. The particular alkene selected should have a boiling point within about 30° C. of the polar alkyl phenol with which it is to form an azeotrope.

Examples of suitable higher alkenes are those formed by trimerization of methylpropene (iso-butylene); decene-1; dodecene-1; and propylene tetramer. The trimers of methylpropene may be obtained as a by-product in the butylation of cresols with iso-butylene to produce butylcresols. If the trimer be obtained in this fashion, it may be purified to remove cresylic impurities by caustic scrubbing followed by fractional distillation.

In accordance with the invention, the boiling point of the non-polar alkene azeotroping agent must be within about 30° C. of the polar alkyl phenol or phenols with which it is to azeotrope. The boiling points of the examples mentioned above are:

|  | ° C. |
|---|---|
| Trimer of methyl propene | 175–177 |
| Decene-1 | 172 |
| Dodecene-1 | 218 |
| Propylene tetramer, about | 188–198 |

The alkene-polar alkyl phenol azeotrope contains about 80–90% by weight alkene at atmospheric pressure. It is, therefore, necessary, when the distillation is conducted at atmospheric pressure, to use amounts of alkene in a weight ratio to the polar alkyl phenol with which it is to azeotrope of at least 6 to 1. However, since the weight percent of the alkene in the azeotrope decreases with pressure, lesser amounts of alkene can be used if the distillation is carried out at higher pressures. It is preferable to add an excess of alkene usually about 10 to 1 to 20 to 1 for atmospheric distillations. The excess alkene is then removed in the distillaiton after the alkene-polar alkyl phenol azeotrope. Some of the less polar alkyl phenol may also come over in this fraction in which case, the fraction may be recycled to increase the overall yield.

After the azeotropic distillation, the azeotroped alkyl phenol may be separated from the alkene by conventional means such as steam distillation or crystallization.

The accompanying flow sheet and the following examples will serve to further illustrate the practice of the invention.

Example I 200 grams of a $C_{12}$ branched alkene (trimer of iso-butylene) was added to 200 grams of a mixture of 2,6-dimethyl phenol and monomethyl phenols which had been previously analyzed and found to contain 91.5% 2,6-dimethyl phenol, 1.9% 2-methyl phenol, and 6.6% 3-methyl phenol and 4-methyl phenol. The mixture was pumped to a still equipped with a helix-packed distillation column. The mixture was distilled at atmospheric pressure with a 19:1 reflux ratio. The first series of cuts were collected up to a boiling point of 176° C. A second series of cuts were then collected between 176 and 200° C. The third series of cuts were collected at 201° C. Analysis of the fractions by vapor phase chromatography revealed the following constituents:

was added to 200 grams of crude 2,6-dimethyl phenol (2,6-xylenol) having an analysis as follows:

|  | Percent |
|---|---|
| 2,6-dimethyl phenol | 93.5 |
| 2-methyl phenol | 2.0 |
| 3-methyl phenol and 4-methyl phenol | 4.1 |
| Phenol | 0.4 |

TABLE I

| Fraction | Boiling point, °C | Weight (g.) | Weight (percent) | Area percent composition ||||
|---|---|---|---|---|---|---|---|
| | | | | $C_{12}$ trimer | 2,6-dimethyl phenol | 2-methyl phenol | 3-methyl phenol 4-methyl phenol |
| 1 | <173 | 40.7 | 10.2 | 79.0 | 0.3 | 8.4 | 12.3 |
| 2 | 173-176 | 38.8 | 9.7 | 79.6 | 1.6 | 2.5 | 16.4 |
| 3 | 176 | 39.8 | 9.9 | 86.3 | 6.7 | 0.2 | 6.7 |
| 4 | 176 | 19.5 | 4.9 | 88.3 | 7.4 | 0.03 | 4.3 |
| 5 | 176 | 23.5 | 5.9 | 92.3 | 7.7 | | |
| 6 | 176 | 18.6 | 4.6 | 90.8 | 9.2 | | |
| 7 | 176-178 | 38.4 | 9.6 | 90.7 | 9.3 | | |
| 8 | 178-198 | 11.6 | 2.9 | 67.1 | 32.9 | | |
| 9 | 178-200 | 9.1 | 2.3 | 4.8 | 95.2 | | |
| 10(1) | 201 | 89.4 | 22.3 | 0.06 | 99.94 | | |
| 11(1) | 201 | 45.0 | 11.2 | | 100 | | |
| Residue | | 26.0 | 6.5 | 0.1 | 99.8 | | 0.1 |

Fractions 1–4 contained almost all of the monomethyl phenols while fractions 10 and 11 were essentially pure 2,6-dimethyl phenol. Fractions 5–9 are suitable for recycle back to the still or the alkene may be separated from the 2,6-dimethyl phenol by steam distillation.

The mixture was pumped to a still equipped with a helix-pack distillation column and distilled at atmospheric pressure (732–742 mm. Hg) with a 10:1 reflux ratio. The cut or fractions were collected and analyzed by vapor phase chromatograpy as follows:

TABLE II

| Fraction | Boiling point, °C. | Weight (g.) | Weight (percent) | Area percent composition |||||
|---|---|---|---|---|---|---|---|---|
| | | | | Dodecene-1 | 2,6-dimethyl phenol | 2-methyl phenol | 3-methyl phenol 4-methyl phenol | Phenol |
| 1 | 170-195 | 11.5 | 2.3 | 41.9 | 41.9 | 7.6 | 8.3 | 0.3 |
| 2 | 195-197 | 20 | 4.0 | 45.0 | 39.4 | 6.0 | 9.3 | 0.3 |
| 3 | 197 | 65 | 13.0 | 37.8 | 53.2 | 1.5 | 7.3 | 0.2 |
| 4 | 197-198 | 67 | 13.4 | 35.9 | 61.1 | | 2.9 | |
| 5 | 198 | 35 | 7.0 | 36.8 | 61.4 | 0.1 | 1.7 | |
| 6 | 198-199 | 65.5 | 13.1 | 37.7 | 62.3 | | | |
| 7 | 199-200 | 56 | 11.2 | 36.4 | 63.5 | | | |
| 8 | 200-205 | 24.5 | 4.9 | 63.6 | 36.4 | | | |
| 9 | 205-212 | 13.5 | 2.7 | 95.7 | 4.3 | | | |
| 10 | 212-213 | 22 | 4.4 | 99.8 | 0.2 | | | |
| 11 | 213-220 | 101 | 20.2 | 100 | | | | |
| Residue | | 19 | 3.8 | | | | | |

Similar results are obtained when the weight ratios of trimer to monomethyl phenol impurities are varied from 6 parts by weight trimer per part by weight monomethyl phenol mixture to 20 parts by weight trimer per part by weight of monomethyl phenol.

Example II

The pure 2,6-dimethyl phenol obtained in the third series of cuts (fractions 10 and 11) in Example I was further tested for purity by obtaining the freezing point of the material. A portion of the liquid was placed in a test tube equipped with a stirrer and a thermometer. The test tube was immersed in an ice bath while the contents were stirred. When definite crystallization was started, stirring was stopped and the freezing point considered to be the maximum temperature reached after super cooling. The freezing point was found to be 45.5° C.

Example III 300 grams of dodecene-1 (obtained from the Gulf Oil Corporation) having an analysis as follows:

|  | Percent |
|---|---|
| n-Alpha olefins | 93.6 |
| Mono-olefins | 98.5 |
| Saturates | 1.5 |
| Aromatics and di-olefins | Nil |

Fractions 1–5 contain all the phenol and mono-methyl phenol impurities. Fractions 6–9 contain pure 2,6-dimethyl phenol on a dodecene-1 free basis. It should be noted here that an excess of dodecene-1 was used. A cut-back on total amount of azeotroping agent results in recovery of pure 2,6-dimethyl phenol. However, the 2,6-dimethyl phenol is easily recovered from the alkene by steam distillation or by crystallization.

The 2,6-dimethyl phenol in fractions 6–9 was recovered by crystallization and a 45.4° C. freezing point determined indicating a high purity product.

Example IV

Another azeotropic distillation under the conditions of Example III was carried out using instead of dodecene-1, 300 grams of propylene tetramer (obtained from Gulf Oil Corporation) having an analysis as follows:

|  | Percent |
|---|---|
| Mono-olefins | 98 |
| Di-olefins | 2 |
| Aromatics | Nil |

The results of the distillation are as follows:

TABLE III

| Fraction | Boiling Point, °C. | Weight (g.) | Weight (percent) | Area percent composition | | | | |
|---|---|---|---|---|---|---|---|---|
| | | | | Propylene tetrzmer | 2,6-dimethyl phenol | 2-methyl phenol | 3-methyl phenol 4-methyl phenol | Phenol |
| 1 | 163–175 | 4 | 0.8 | 75.2 | 11.0 | 5.9 | 7.6 | 0.3 |
| 2 | 175–185 | 35 | .7 | 76.0 | 7.1 | 5.6 | 11.1 | 0.2 |
| 3 | 185–187 | 87.5 | 17.5 | 75.4 | 21.3 | 0.3 | 2.9 | 0.1 |
| 4 | 187 | 96 | 19.1 | 71.6 | 27.6 | | 0.8 | |
| 5 | 187–190 | 38 | 7.6 | 67.5 | 32.5 | | | |
| 6 | 190–191 | 53.5 | 10.7 | 68.9 | 31.1 | | | |
| 7 | 191–193 | 76 | 15.1 | 57.7 | 42.3 | | | |
| 8 | 193–195 | 31 | 6.1 | 50.7 | 49.3 | | | |
| 9 | 195–196 | 19.5 | 3.9 | 49.5 | 50.5 | | | |
| 10 | 196–198 | 7.5 | 1.5 | 34.0 | 66.0 | | | |
| 11 | 198–205 | 38 | 7.6 | 6.8 | 93.2 | | | |
| Residue | | 11 | 2.2 | | | | | |

Fractions 5–11 were essentially free of phenolic impurities. 2,6-dimethyl phenol crystallized from the propylene tetramer has a freezing point of 45.4° C. As in Example III, the components of the fractions indicate that an excess of the azeotroping agent was used and that a cut-back would result in recovery of pure 2,6-dimethyl phenol, without the need of further separation from the alkene.

The foregoing has presented a novel process for the separation of polar alkyl phenols from non-polar alkyl phenols which have hitherto been very difficultly separable. The process allows, for example, 2,6-dimethyl phenol to be separated from mono-methyl phenols with very little loss of 2,6-dimethyl phenol.

What is claimed is:

1. A process for the separation of at least two alkyl phenols having close boiling points but containing at least one alkyl phenol that is more polar than the others in the mixture comprising:
    (a) adding to said mixture a non-polar higher alkene having from 10–13 carbon atoms and a boiling point within 30° C. of the said more polar alkyl phenol to form an azeotrope of the alkene and the said more polar alkyl phenol; and
    (b) distilling the azeotrope from said mixture to separate the more polar alkyl phenol from the less polar alkyl phenol.

2. The process of claim 1 wherein the non-polar alkene has 12 carbon atoms.

3. The process of claim 2 wherein the non-polar alkene is selected from the class consisting of dodecene-1, decene-1, trimers of methyl-propene, and propylene tetramers.

4. The process of claim 1 wherein the mixtures of alkyl phenols comprises 2,6-dimethyl phenol and monomethyl phenols.

5. The process of claim 1 wherein the amount of alkene is from 6 to 20 times by weight of the weight of the monomethyl phenols present in the alkyl phenol mixture.

6. The process of claim 1 wherein the alkene is dodecene-1.

7. The process of claim 1 wherein the alkene is decene-1.

8. The process of claim 1 wherein the alkene is propylene tetramer.

9. The process of claim 1 wherein said more-polar alkyl phenol is separated from said non-polar alkene after the distillation.

References Cited

UNITED STATES PATENTS

| 3,207,794 | 9/1965 | Haines et al. | 203—70 |
| 3,337,424 | 8/1967 | Neuworth et al. | 260—621 |
| 3,397,124 | 8/1968 | Parisse | 203—52 |

WILBUR L. BASCOMB, Jr., Primary Examiner

U.S. Cl. X.R.

203—48, 83; 260—621